(12) United States Patent
Kristensson et al.

(10) Patent No.: US 9,727,133 B2
(45) Date of Patent: Aug. 8, 2017

(54) ULTRASOUND-BASED FACIAL AND MODAL TOUCH SENSING WITH HEAD WORN DEVICE

(71) Applicant: Sony Corporation, Tokyo (JP)

(72) Inventors: Andreas Kristensson, Söndra Sandby (SE); Alexander Hunt, Tygelsjö (SE); Ola Thörn, Limhamn (SE); Magnus Landqvist, Lund (SE)

(73) Assignees: SONY CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 35 days.

(21) Appl. No.: 14/491,084

(22) Filed: Sep. 19, 2014

(65) Prior Publication Data
US 2016/0085298 A1    Mar. 24, 2016

(51) Int. Cl.
| | | |
|---|---|---|
| *G06F 3/01* | (2006.01) | |
| *G06F 3/041* | (2006.01) | |
| *G02B 27/01* | (2006.01) | |
| *G06F 1/16* | (2006.01) | |
| *G06K 9/00* | (2006.01) | |

(52) U.S. Cl.
CPC ........... *G06F 3/012* (2013.01); *G02B 27/017* (2013.01); *G06F 1/163* (2013.01); *G06F 3/015* (2013.01); *G06F 3/017* (2013.01); *G06F 3/041* (2013.01); *G06K 9/00302* (2013.01); *G06K 9/00315* (2013.01); *G06K 9/00355* (2013.01); *G02B 2027/0187* (2013.01)

(58) Field of Classification Search
None
See application file for complete search history.

(56) References Cited

U.S. PATENT DOCUMENTS

| | | | |
|---|---|---|---|
| 2004/0024312 A1 | 2/2004 | Zheng | |
| 2010/0049046 A1* | 2/2010 | Peiffer | A61B 8/13 600/443 |
| 2010/0240994 A1* | 9/2010 | Zheng | A61B 8/00 600/438 |
| 2010/0289740 A1* | 11/2010 | Kim | G04G 21/04 345/157 |
| 2011/0054360 A1 | 3/2011 | Son et al. | |

(Continued)

FOREIGN PATENT DOCUMENTS

EP        2698686 A2    2/2014

OTHER PUBLICATIONS

Harrison et al. "Skinput: Appropriating the Body as an Input Surface", Microsoft Research, 2010.*

(Continued)

*Primary Examiner* — Patrick Edouard
*Assistant Examiner* — Matthew Yeung
(74) *Attorney, Agent, or Firm* — Tucker Ellis LLP

(57) ABSTRACT

A method, a device, and a non-transitory storage medium having instructions to analyze a characteristic of an ultrasonic signal that propagated on a face of a user of the computational device and effected by an on-body touch, by the user, in an area in which the ultrasonic signal has propagated, wherein the characteristic includes at least one of facial expression or contraction state of a facial muscle; select an input based on an analysis of the ultrasound event; and perform an action specified by the input.

16 Claims, 9 Drawing Sheets

(56) References Cited

U.S. PATENT DOCUMENTS

| | | | | |
|---|---|---|---|---|
| 2012/0229248 A1* | 9/2012 | Parshionikar | .......... | G08B 21/06 340/3.1 |
| 2012/0249409 A1* | 10/2012 | Toney | .................... | G06F 3/017 345/156 |
| 2013/0135223 A1* | 5/2013 | Shai | ........................ | G06F 3/014 345/173 |

OTHER PUBLICATIONS

Mujibiya et al. "The Sound of Touch: On-body Touch and Gesture Sensing Based on Transdermal Ultrasound Propagation", Microsoft Research, 2013.*

"Demonstrating the Feasibility of Using Forearm Electromyography for Muscle-Computer Interfaces" Sopanas et al., Computer Human Interaction 2008 http://delivery.acm.org/10.1145/1360000/1357138/p515-saponas.pdf?ip=151.207.250.71&id=1357138&acc=ACTIVE%20SERVICE&key=C15944E53D-0ACA63%2E4D4702B0C3E38B35%2E4D4702B0C3E38B35%-2E4D4702B0C3E38B35&CFID=63775.*

"Skinput: Appropriating the Skin as an Interactive Canvas" Communication of the ACM, Oct. 2011.*

Mujibiya, Adiyan, et al. "The Sound of Touch: On-body Touch and Gesture Sensing Based on Transdermal Ultrasound Propagation". ITS '13, Oct. 6-9, 2013, St Andrews, United Kingdom.

Mol, Chris R. and Breddels, Paul A. "Ultrasound velocity in muscle". J. Acoust. Soc. Am. 71, 455 (1982); http://dx.doi.org/10.1121/1.387467.

Serrano, Marcos, et al. "Exploring the Use of Hand-To-Face Input for Interacting with Head-Worn Displays". CHI 2014, Apr. 26-May 1, 2014, Toronto, Canada.

International Search Report and Written Opinion dated Jun. 8, 2015 for corresponding International Application No. PCT/IB2015/051571.

* cited by examiner

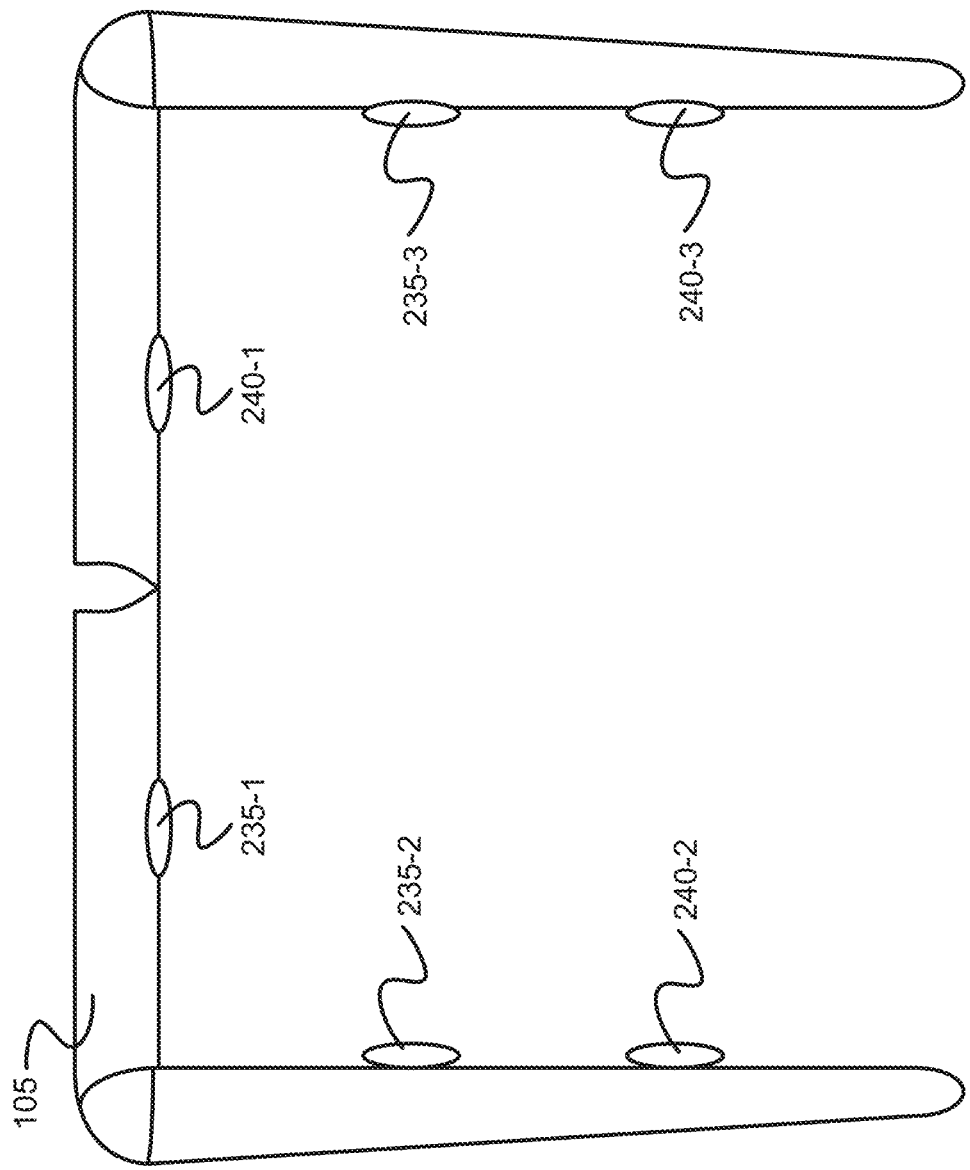

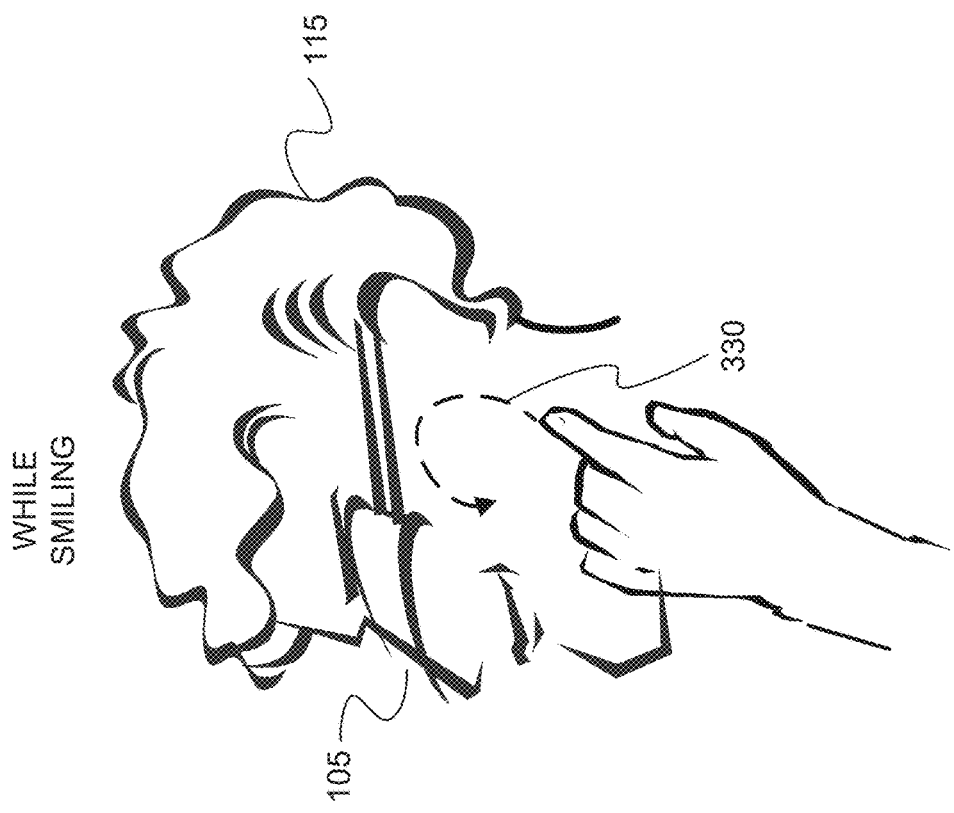
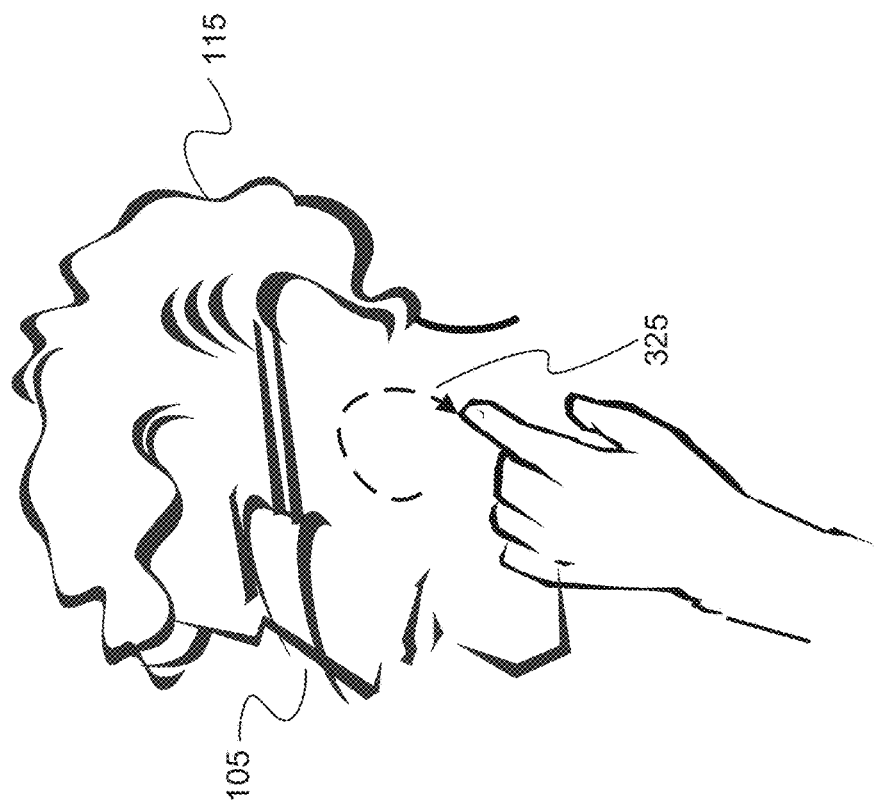

ULTRASOUND-BASED FACIAL AND MODAL TOUCH SENSING WITH HEAD WORN DEVICE

BACKGROUND

A mobile device, such as a smartphone, offers various services to their users. Users may interact with the displays of the mobile devices via touch panels and/or touchless panels. While touch and touchless input technologies allow users a great deal of flexibility when operating the mobile devices, designers and manufacturers are continually striving to improve the interoperability of the mobile device with the user.

SUMMARY

According to one aspect, a method may comprise transmitting, by a device that is worn by a user, an ultrasonic signal, wherein the ultrasonic signal propagates on the user's face; receiving, by the device, an ultrasound event that includes receipt of the ultrasonic signal that propagated on the user's face and effected by an on-body touch, by the user, in an area in which the ultrasonic signal has propagated; analyzing, by the device, a characteristic of the ultrasonic signal received, wherein the characteristic includes at least one of facial expression or contraction state of a facial muscle; and selecting, by the device, an input based on an analysis of the ultrasound event.

Additionally, the method may comprise performing, by the device, an action specified by the input.

Additionally, the method may comprise storing a database that maps ultrasound event data to data indicating inputs, wherein the ultrasound event data includes facial expression data and state of muscle data; and comparing the characteristic of the ultrasonic signal received to data stored in the database; and wherein the selecting may comprise selecting the input based on the comparing.

Additionally, the input may be one of an input that can be made via a mouse, a keyboard, or a touch display.

Additionally, the analyzing may comprise analyzing the characteristic of the ultrasonic signal received, wherein the characteristic includes at least one of frequency, amplitude, or propagation speed; and identifying a type of on-body touch based on the analyzing.

Additionally, the input may be application-specific.

Additionally, the on-body touch may be a tap or a sliding gesture.

According to another aspect, a device may comprise an ultrasound transducer, wherein the ultrasound transducer transmits an ultrasonic signal, wherein the ultrasonic signal propagates on a face of a user wearing the device, and wherein the ultrasound transducer receives an ultrasound event that includes receipt of the ultrasonic signal that propagated on the user's face and effected by an on-body touch, by the user, in an area in which the ultrasonic signal has propagated; a memory, wherein the memory stores software; and a processor, wherein the processor executes the software and may analyze a characteristic of the ultrasonic signal received, wherein the characteristic includes at least one of facial expression or contraction state of a facial muscle; and may select an input based on an analysis of the ultrasound event.

Additionally, the device may further comprise a communication interface, and wherein the processor may further execute the software to transmit, via the communication interface, the input to another device.

Additionally, the processor may further execute the software to store a database that maps ultrasonic signal characteristic data to data indicating inputs, wherein the ultrasonic signal characteristic data includes facial expression data and state of muscle data; and compare the characteristic of the ultrasonic signal received to data stored in the database; and wherein, when selecting, the processor may further execute the software to select the input based on a comparison.

Additionally, the state of muscle data may include data indicating a relaxed muscle state, a contracted muscle state, and a transition from one muscle state to a different muscle state over a specified period of time.

Additionally, when analyzing, the processor may further execute the software to analyze the characteristic of the ultrasonic signal received, wherein the characteristic includes at least one of frequency, amplitude, or propagation speed; and identify a type of on-body touch based on an analysis of the characteristic.

Additionally, the input may be one of an input that can be made via a mouse, a keyboard, or a touch display.

Additionally, the processor may further execute the software to identify an on-body touch that indicates to activate ultrasound sensing.

Additionally, the device may further comprise a machine learning module that allows the user to train the device to recognize particular on-body touch events performed by the user and select inputs corresponding to the on-body touch events.

According to yet another aspect, a non-transitory storage medium that stores instructions executable by a processor of a computational device, which when executed, may cause the computational device to analyze a characteristic of an ultrasonic signal that propagated on a face of a user of the computational device and effected by an on-body touch, by the user, in an area in which the ultrasonic signal has propagated, wherein the characteristic includes at least one of facial expression or contraction state of a facial muscle; select an input based on an analysis of the ultrasonic signal; and perform an action specified by the input.

Additionally, the instructions may comprise instructions to analyze a characteristic of the ultrasonic signal, wherein the characteristic includes at least one of frequency, amplitude, or propagation speed; and identify a type of on-body touch based on an analysis of the characteristic.

Additionally, the instructions may comprise instructions to store a database that maps ultrasonic signal profiles to inputs; and use the database to select the input.

Additionally, the instructions may comprise instructions to identify an on-body touch that indicates that the computational device is to activate ultrasound sensing.

Additionally, the instructions may comprise instructions to allow the user to train the computational device to recognize particular on-body touch events performed by the user and select inputs corresponding to the on-body touch events.

DESCRIPTION OF THE DRAWINGS

FIG. 2D is a diagram illustrating a top view of an exemplary head worn device including ultrasonic transducers;

FIGS. 3A-3F are diagrams illustrating exemplary scenarios pertaining to an exemplary embodiment of ultrasound-based facial and modal touch sensing.

DETAILED DESCRIPTION OF PREFERRED EMBODIMENTS

Figure 1:
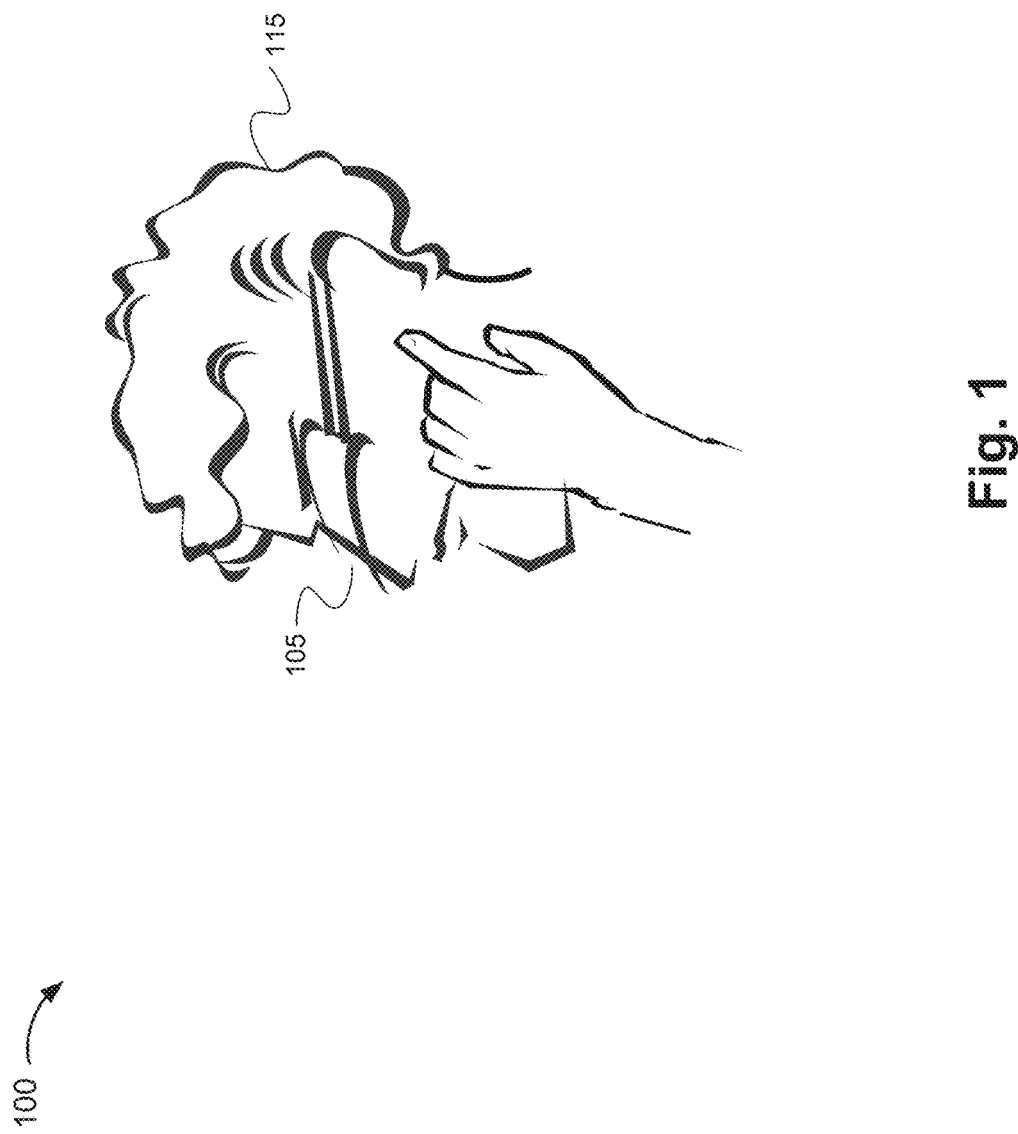
FIG. 1 is a diagram illustrating an exemplary environment in which exemplary embodiments of ultrasound-based facial and modal touch sensing may be implemented.

The following detailed description refers to the accompanying drawings. The same reference numbers in different drawings may identify the same or similar elements.

Ultrasound transmission and sensing through a user's body have become a recent area of research. For example, the user may wear a wristlet or an armband in which ultrasonic signals are transmitted and propagated via the user's skin (e.g., transdermal ultrasound propagation). The wearable device includes a transmitter, which transmits the ultrasonic signal, and a receiver, which receives the ultrasonic signal. According to an exemplary use case, the user may touch his or her forearm with his or her finger, grip the forearm, or perform a slide movement on the forearm. The ultrasonic signal is measured at one or multiple frequencies and/or amplitudes via the receiver. Based on the received value(s) and stored signal profiles, the type of input performed by the user can be determined. For example, the user may tap his or her forearm at a particular location and this information (i.e., tap and location) may be determined. This information can be used as an input to the wearable device or another device.

Ultrasound travels through muscle tissue at different speeds depending on the tautness of the muscle tissue. For example, the velocity of ultrasound propagation may be increased (e.g., up to 3 m/s) when a muscle is contracted due to the blood content of the muscle.

A head worn display (HWD) device (referred to simply as a "head worn device") has very limited user interaction capabilities. For example, the head worn device may include a few buttons and a small touch input area (e.g., a capacitive touch pad located on the temple portion of the head worn device). The head worn device may also receive inputs via a user's voice commands. However, voice input does not work well in particular environments (e.g., a noisy environment, a quiet environment in which the user does not want to speak, etc.). Thus, in some cases, the user is limited to a few buttons and a small touch pad to perform a few touch inputs.

According to an exemplary embodiment, a head worn device includes an ultrasound transducer. The ultrasound transducer includes a transducer that acts as a transmitter of ultrasound and another transducer that acts as a receiver of the ultrasound. During the time that the ultrasound transducers transmit and receive the ultrasound, the user performs an on-body action (e.g., on the user's face). The user's action may involve a single hand of the user or both hands. The head worn device identifies the action based on values of the signal received via the ultrasound receiver. The head worn device maps the identified action to an input, and in turn, performs the input.

According to an exemplary embodiment, the head worn device provides a modal interface based on ultrasound sensing. The head worn device detects different modes of interface based on whether the user's facial muscles are contracted or not. For example, according to an exemplary embodiment, one mode of operation is when the user's facial muscles are in a relaxed state and another mode of operation is when the user's facial muscles are in a contracted or taut state. According to yet another embodiment, one mode of operation is when the user transitions from the relaxed state to the contracted state or vice versa within a certain period of time. For example, when the user contracts muscles in his or her face and then relaxes those muscles within one second, the user's action (e.g., sliding his or her finger along his or her arm) is interpreted as a particular input. According to still another embodiment, multiple modes of operation are provided based on multiple degrees or levels of contraction of the user's facial muscle. According to an exemplary embodiment, the head worn device detects differences in propagation speeds of ultrasound when the user's muscle is in particular states (e.g., a contracted state, a relaxed state, etc.) or transitions thereof.

According to an exemplary embodiment, the head worn device detects different modes of interface corresponding to the facial expression of the user (e.g., smiling, sad, serious, normal, etc.). For example, the user may perform an on-body gesture when the user exhibits a certain expression or makes a transition from one expression to another (e.g., normal to smiling, etc.). According to an exemplary embodiment, the user may use other areas of the body, such as the neck area, to perform an on-body action when using the head worn device.

In view of the different modes of operation, different inputs may be mapped to each mode and, more particularly, each type of action performed by the user (e.g., tap, palming of the user's face, sliding gesture, etc.), as well as other factors (e.g., location, pressure, time (e.g., onset and offset of an action).

According to an exemplary embodiment, the head worn device constitutes a main device. According to another embodiment, a main device receives input via the head worn device. For example, the main device may take the form of a mobile device, a television, or any other end user device. As inputs are interpreted based on the ultrasound technology and user actions, these inputs are transmitted by the head worn device to the main device. The main device operates according to the received inputs.

According to an exemplary embodiment, the head worn device allows the user to manually lock in a particular mode. For example, the head worn device may provide a user interface or some other type of input mechanism (e.g., a button, vocal command, etc.) that allows the user to transition into and operate in a particular sensing mode. According to another exemplary embodiment, the head worn device allows the user to lock in a mode by performing a particular action. For example, when the user's face is in a relaxed state or the user has a normal expression, such a state signifies a "locked" or a "dormant" state, and if the user flexes his or her facial muscles or performs some other deliberate action (e.g., a particular facial expression), the other action will be detected as touch events. In this way, the sensing features of the head worn device can be easily activated and deactivated by the user without the user having to manually activate and deactivate the wearable device.

FIG. 1 is a diagram of an exemplary environment 100 in which exemplary embodiments of ultrasound-based, facial and modal touch sensing may be implemented. As illustrated, environment 100 includes a head worn device 105 and a user 115. According to this embodiment, as previously described, head worn device 105 includes ultrasound sensing and user device capabilities.

Although FIG. 1 illustrates head worn device 105 as a visor type of ultrasound device, according to other embodiments, other forms of ultrasound devices may be implemented, such as a helmet type, a glasses type, etc. Referring to FIG. 1, head worn device 105 includes a device that transmits and receives ultrasonic signals. For example, head worn device 105 includes an ultrasound transducer. The ultrasound transducer includes a transducer that acts as a transmitter of ultrasound and another transducer that acts as a receiver of the ultrasound. Based on a user's on-body action, head worn device 105 identifies a mode and action based on the value of the signal received via the ultrasound receiver. Head worn device 105 maps the mode and the user action (e.g., tap, sliding gesture, etc.) to a particular input. In turn, head worn device 105 operates in response to the input. Head worn device 105 includes a display. For example, the display may present to the user various media (e.g., movies, pictures, etc.), user interfaces to operate or control head worn device 105 or user interfaces associated with various applications (e.g., web browsing, media player, game, etc.).

According to an exemplary use case, user 115 may use his or her hand to perform various actions (e.g., tap, sliding gesture, palm, etc.), which in turn is interpreted as an input via the ultrasound receiver. The user may use one hand or both hands, simultaneously or serially. Additionally, as previously described, user 115 may control the state of his or her facial muscles and/or use various facial expressions, in combination with the actions performed by the user's hand(s) to invoke a particular input.

Figure 2A:
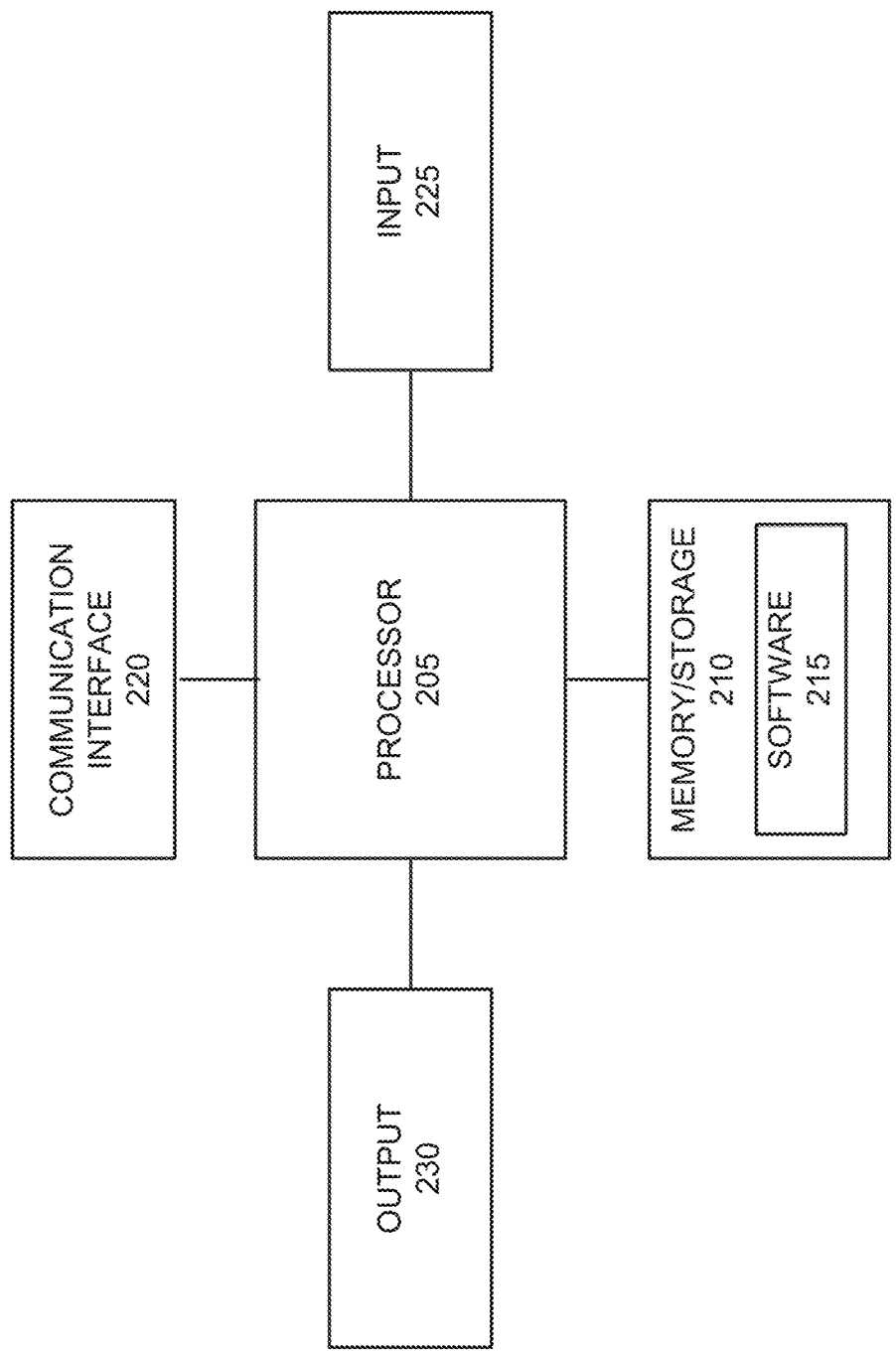
FIG. 2A is a diagram illustrating exemplary components of a head worn device.

FIG. 2A is a diagram illustrating exemplary components of head worn device 105. As illustrated, according to an exemplary embodiment, head worn device 105 includes a processor 205, memory/storage 210, software 215, a communication interface 220, an input 225, and an output 230. According to other embodiments, head worn device 105 may include fewer components, additional components, different components, and/or a different arrangement of components than those illustrated in FIG. 2A and described herein.

Processor 205 includes one or multiple processors, microprocessors, data processors, co-processors, and/or some other type of component that interprets and/or executes instructions and/or data. Processor 205 may be implemented as hardware (e.g., a microprocessor, etc.) or a combination of hardware and software (e.g., a SoC, an ASIC, etc. Processor 205 performs one or multiple operations based on an operating system and/or various applications or programs (e.g., software 215).

Memory/storage 210 includes one or multiple memories and/or one or multiple other types of storage mediums. For example, memory/storage 210 may include random access memory (RAM), dynamic random access memory (DRAM), cache, read only memory (ROM), a programmable read only memory (PROM), and/or some other type of memory. Memory/storage 210 may include a hard disk (e.g., a magnetic disk, an optical disk, a magneto-optic disk, a solid state disk, etc.).

Software 215 includes an application or a program that provides a function and/or a process. Software 215 may include firmware. By way of example, software 215 may comprise a telephone application, a multi-media application, an e-mail application, a contacts application, a calendar application, an instant messaging application, a web browsing application, a location-based application (e.g., a Global Positioning System (GPS)-based application, etc.), a camera application, etc. Software 215 includes an operating system (OS). For example, depending on the implementation of head worn device 105, the operating system may correspond to iOS, Android, Windows Phone, or another type of operating system (e.g., proprietary, BlackBerry OS, etc.). According to an exemplary embodiment, software 215 includes an application that interprets ultrasonic signal characteristics and selects an input, as described herein.

Communication interface 220 permits head worn device 105 to communicate with other devices, networks, systems, etc. Communication interface 220 may include one or multiple wireless interfaces and/or wired interfaces. Communication interface 220 may include one or multiple transmitters, receivers, and/or transceivers. Communication interface 220 operates according to one or multiple protocols, a communication standard, and/or the like. Communication interface 220 permits communication with head worn device 105.

Input 225 permits an input into head worn device 105. For example, input 225 may include a button, a switch, a touch pad, an input port, speech recognition logic, and/or some other type of input component. Output 230 permits an output from head worn device 105. For example, output 230 may include a speaker, a display, a light, an output port, and/or some other type of output component.

Head worn device 105 may perform a process and/or a function in response to processor 205 executing software 215 stored by memory/storage 210. By way of example, instructions may be read into memory/storage 210 from another memory/storage 210 or read into memory/storage 210 from another device via communication interface 220. The instructions stored by memory/storage 210 causes processor 205 to perform the process or the function. Alternatively, head worn device 105 may perform a process or a function based on the operation of hardware (processor 205, etc.).

Figure 2B:
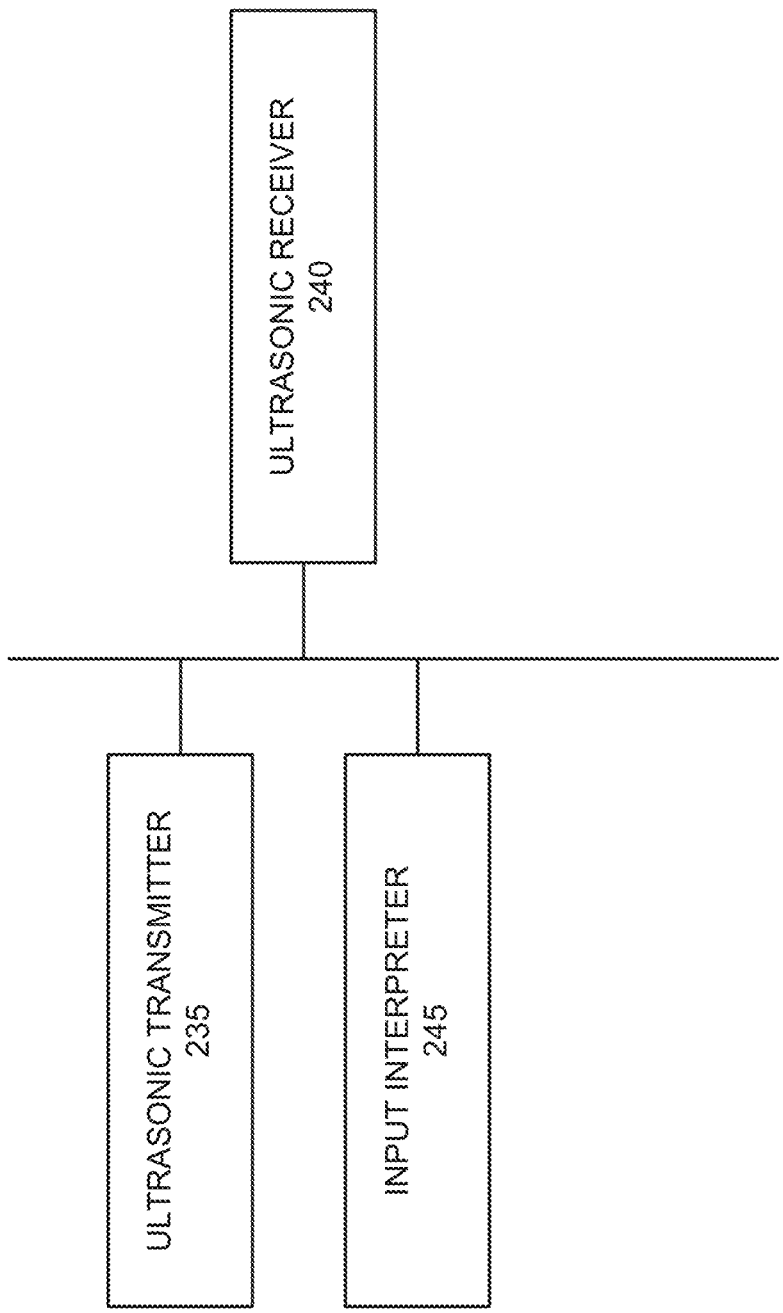
FIG. 2B is a diagram illustrating exemplary components of the head worn device.

FIG. 2B is a diagram illustrating exemplary components of head worn device 105. As illustrated, according to an exemplary embodiment, head worn device 105 includes an ultrasonic transmitter 235, an ultrasonic receiver 240, and an input interpreter 245. According to other embodiments, head worn device 105 may include additional components, different components, and/or a different arrangement of components than those illustrated in FIG. 2B and described herein. The connections between the components are exemplary.

Ultrasonic transmitter 235 transmits an ultrasonic signal. For example, ultrasonic transmitter 235 transmits ultrasonic signals between 20 kHz and 100 kHz. Ultrasonic transmitter 235 may be configured to transmit at a particular center frequency. Ultrasonic transmitter 235 may be implemented using an ultrasound transducer, an ultrasound sensor, or an audio signal generator. For example, a low-cost piezoelectric ultrasound transducer may be used.

Ultrasonic receiver 240 receives an ultrasonic signal. Ultrasonic receiver 240 measures a characteristic of the ultrasonic signal, such as frequency and/or amplitude. Ultrasonic receiver 240 may also measure the phase of the ultrasonic signal. Ultrasonic receiver 240 may be implemented using an ultrasound transducer, an ultrasound sensor, or other audio codec chip.

Referring to FIG. 2D, according to an exemplary embodiment, multiple ultrasonic transmitters 235 and multiple ultrasonic receivers 240 may be integrally included and situated with head worn device 105. For example, head worn device 105 may include ultrasonic transmitters 235-1 through 235-3 and ultrasonic receivers 240-1 through 240-3. According to other embodiments, head worn device 105 may include additional or fewer ultrasonic transmitters 235 and/or ultrasonic receivers. Additionally, or alternatively, these components may be situated in locations different from those illustrated. Additionally, or alternatively, ultrasonic transmitters 235 and ultrasonic receivers 240 may be implemented as a single component (e.g., an ultrasonic transceiver). Depending on the number and location of these components, the user may perform actions on various parts of his or her face, such as the check area, the chin area, the nose area, the eye area, the forehead area, etc.

Referring back to FIG. 2B, input interpreter 245 includes logic to determine a characteristic of an ultrasonic signal received by ultrasonic receiver 240. For example, as previously described, the characteristic may be the frequency of the ultrasonic signal, the amplitude of the ultrasonic signal, the propagation (e.g., speed) of the ultrasonic signal, and/or the phase of the ultrasonic signal. An ultrasonic signal characteristic may remain static or change over time. Input interpreter 245 may compare an ultrasonic signal characteristic received by ultrasonic receiver 240 to the transmitted ultrasonic signal to identify differences between them and to determine the propagation speed of the ultrasonic signal. Based on the determined ultrasound characteristic(s), input interpreter 245 may generate an ultrasonic signal profile or ultrasonic signal signature. The ultrasonic signal profile correlates to a particular user action (e.g., the user's gesture on the user's arm, etc.).

Input interpreter 245 uses the ultrasonic signal profile as a basis to select a particular input. As described further below, according to an exemplary implementation, input interpreter 245 compares the ultrasonic signal profile to a database that stores ultrasonic signal profiles. Input interpreter 245 uses the mode (e.g., facial muscle state or facial expression) as a basis to select a particular input, as described further below.

According to an exemplary embodiment, input interpreter 245 includes a pre-existing training set of sample values. For example, the sample values may be based on a sample space of various users, who may have differing muscle mass, body mass index (BMI), age, height, and/or other physical characteristics. The algorithm determines the particular input based on a received ultrasonic signal profile and the sample values. According to another exemplary embodiment, input interpreter 245 includes a machine learning algorithm that can be trained, on a per-user basis, to calibrate, identify, and map received ultrasonic signals to particular inputs.

As previously described, input interpreter 245 may store and use a database to map received ultrasonic signals values to inputs. The database may store pre-trained and/or user-trained data that maps ultrasonic signal values to inputs. An exemplary database is described below.

Figure 2C:
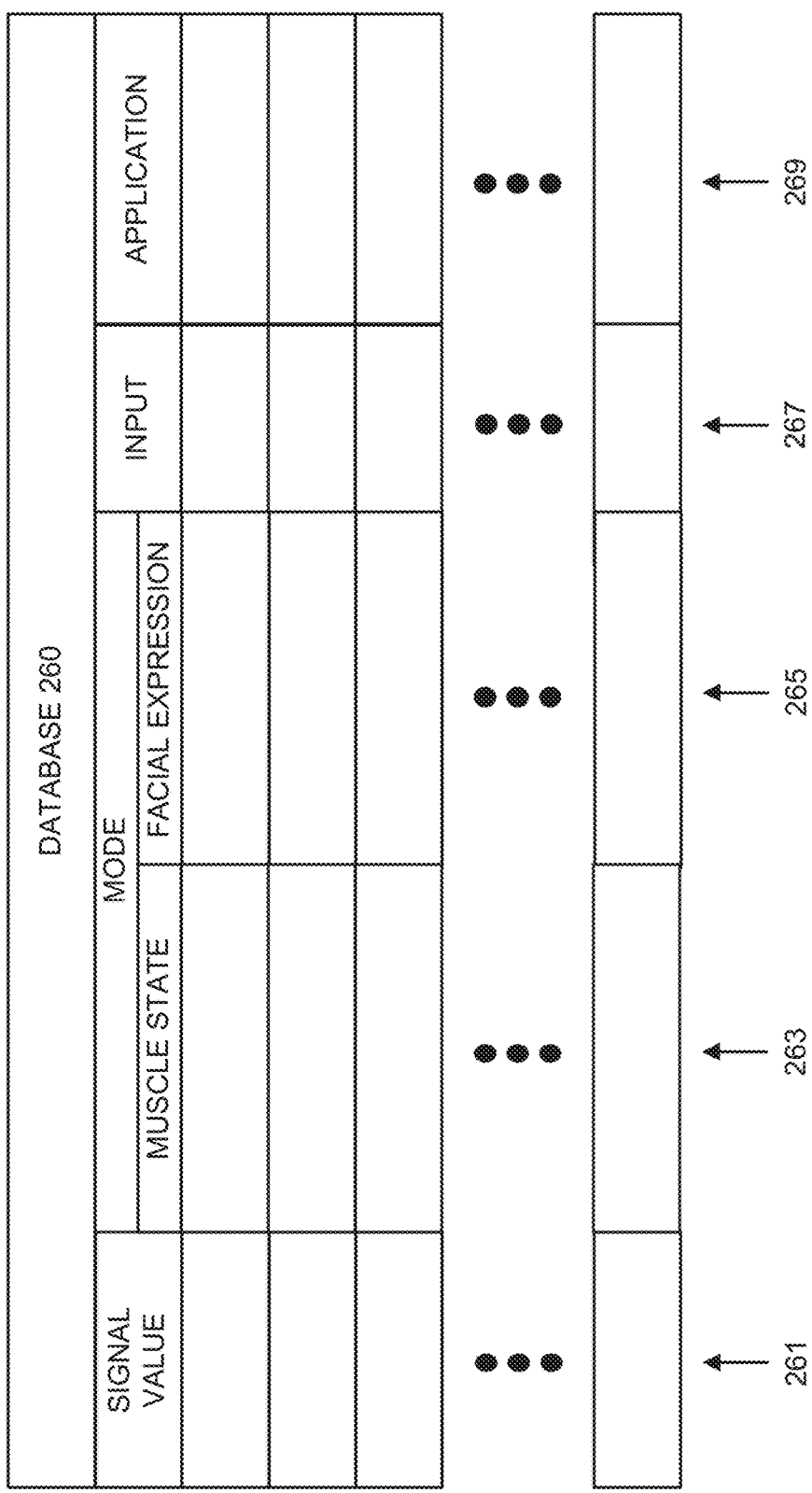
FIG. 2C is a diagram illustrating an exemplary database.

FIG. 2C is a diagram illustrating an exemplary database 260. As illustrated, database 260 includes a signal value field 261, a muscle state field 263, a facial expression field 265, an input field 267, and an application field 269. Depending on whether the user of head worn device 105 undergoes a training process (versus head worn device 105 that has been pre-trained), the data stored in database 260 may correspond to actual values obtained through the use of head worn device 105 and actions performed by the user, instead of data obtained from other users, etc. In some implementations or configurations, head worn device 105 may use pre-trained values and allow the user to train head worn device 105 (e.g., to add a mode or tweak performance of an existing mode).

Signal value field 261 stores data that indicates a characteristic of ultrasonic signals received via ultrasonic receiver 240. For example, signal value field 261 stores data indicating a signature or profile of ultrasonic signals. The signatures or the profiles may indicate frequency, amplitude, phase, duration, and/or propagation characteristics of ultrasonic signals. Signal value field 261 may also indicate user action data. For example, the user action data indicates characteristics of the action performed by the user, such as the type of action (e.g., tap, gesture, etc.), the location of action, the pressure associated with the action, onset of the action, offset of the action, etc.

As further illustrated in FIG. 2C, muscle state field 263 and facial expression field 265 store data indicating a mode of operation. While there may be an overlap in data between a user's muscle state (e.g., relaxed, taut, etc.) and a user's facial expression, differences can also exist. For example, the user may exhibit a facial expression having a particular muscle state of contraction, but then the user may also alter the contractive state of a muscle while maintaining the facial expression.

Muscle state field 263 stores data indicating a mode of operation. For example, a mode may indicate a relaxed state or a contracted state. Alternatively, the mode may indicate a relaxed state or one of multiple contracted states. Still further, a mode may indicate a transition from the relaxed state to a contracted state within a particular time period (e.g., within less than a second, within a second or multiple seconds) or vice versa.

Facial expression field 265 stores data indicating a mode of operation. For example, a mode may indicate a facial expression, such as smiling, frowning, normal expression, etc. Still further, a mode may indicate a transition from one facial expression to another facial expression within a particular time period (e.g., within less than a second, within a second or multiple seconds) or vice versa.

Input field 267 stores data indicating an input. The input can be used to control the operation of head worn device 105. Given the wide variety of inputs available, the input may correspond to a mouse input (e.g., a single click, a double click, a left button click, a right button click, etc.), a keyboard input (e.g., enter, delete, escape, etc.), a gesture on a touch display (e.g., tap, drag, etc.), etc. The input may be application-specific or global. For example, an application-specific input may be an input that changes the volume of a media player. According to another example, a global input may be a mouse click or an enter command which may apply to various applications of head worn device 105.

Application field 269 stores data indicating an application to which the input pertains. For example, an input may be to control the volume of a ring tone of a telephone application or the volume of a media player application.

FIGS. 3A-3F are diagrams illustrating exemplary facial touch actions performed by user 115. As illustrated, user 115 may perform various touch actions on his or her face while wearing head worn device 105. For the sake of simplicity, the exemplary facial touch actions are performed on the side of user 115's face (e.g., cheek area). However, as previously described, other areas of the user 115's face may be used. Additionally, for the sake of simplicity, user 115 performs a touch action with one hand and using his or her index finger. However, according to other examples, user 115 may use both hands, a single hand with multiple fingers, a palm of the hand, etc. Additionally, the inputs described in relation to FIGS. 3A-3F, which are mapped to the exemplary facial actions, are also exemplary.

Figure 3A:
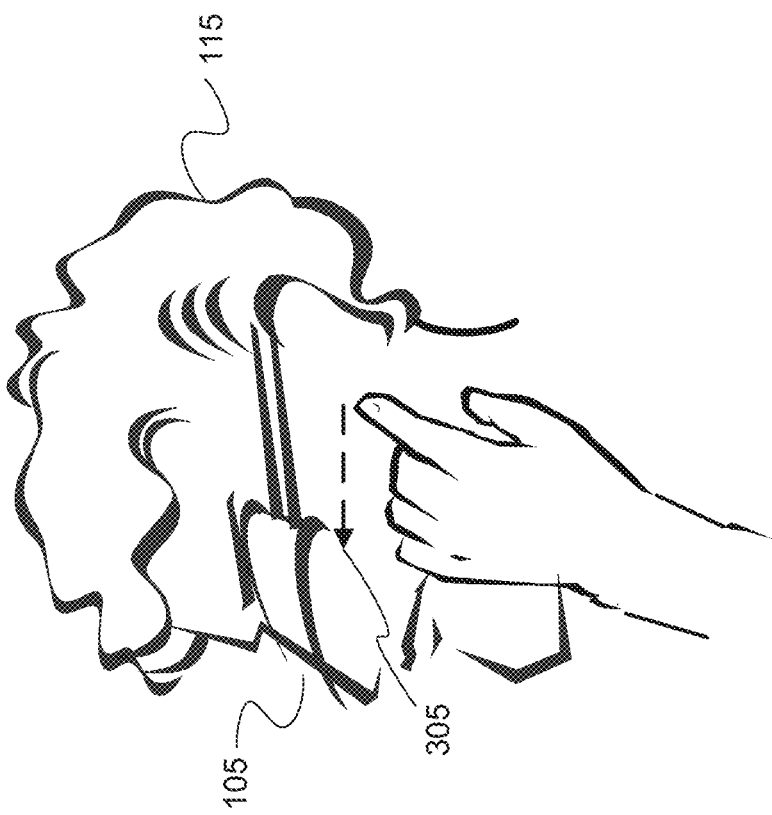
Figure 3B:
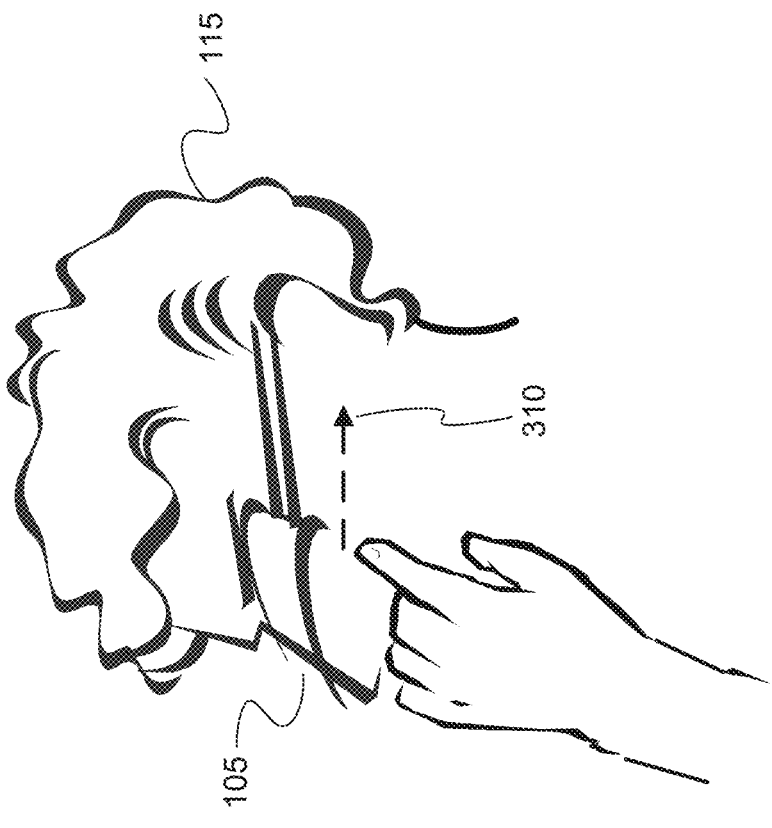
Figure 3D:
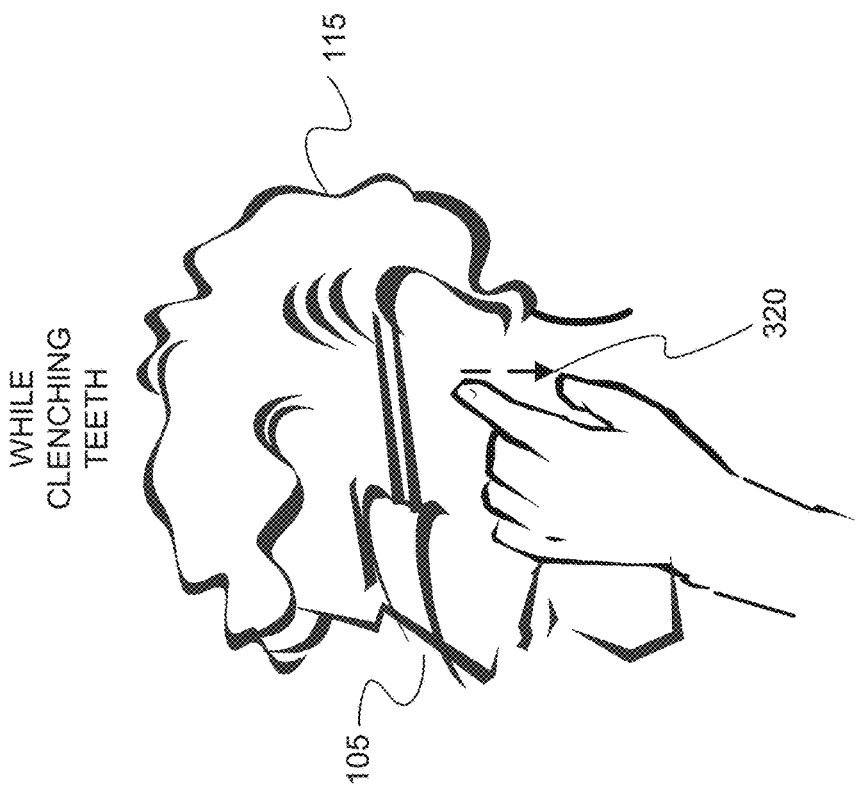
Figure 3C:
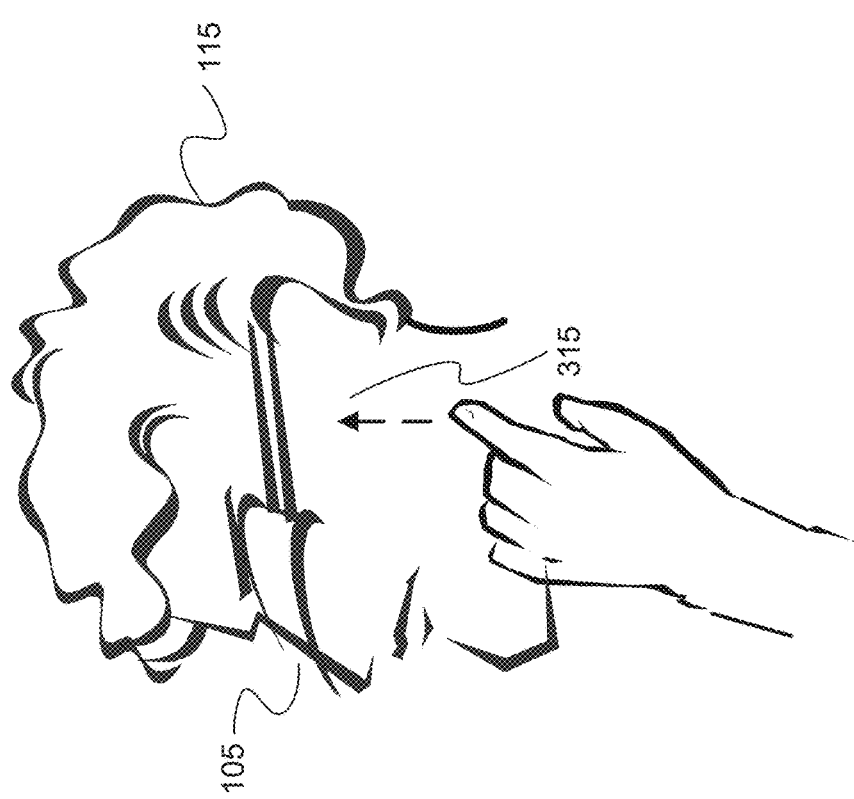

Referring to FIG. 3A, user 115 uses his or her finger to trace a forward line 305. In response, head worn device 105 performs a forward or next action in the context of a menu system. Referring to FIG. 3B, user 115 uses his or her finger to trace a backward line 310. In response, head worn device 105 performs a back or previous action in the context of a menu system. Referring to FIG. 3C, user 115 users his or her finger to trace an upward line 315. In response, head worn device 105 performs an up or previous action in the context of a menu system. Referring to FIG. 3D, while clenching his or her teeth, user 115 uses his or her finger to trace a downward line 320. In response, head worn device 105 performs a down or next action in the context of a menu system. Referring to FIG. 3E, user 115 uses his or her finger to trace a backward, circular line 325. In response, head worn device 105 increases the volume of a media player. Referring to FIG. 3F, while smiling, user 115 uses his or her finger to trace a forward, circular line 330. In response, head worn device 105 decreases the volume of the media player.

As previously described, ultrasound-based, facial and modal touch sensing allows users an increased number of available inputs relative to conventional, head worn devices. For example, a relaxed mode, a contracted mode (or degrees thereof), a facial expression, a transition from one mode to another mode, etc., offer users various modalities of interaction coupled with the available actions users may perform in each mode. Additionally, as previously described, the contraction mode or a degree thereof may be determined based on the propagation characteristics of the ultrasonic signals. Additionally, the user may perform a deliberate action to cause facial touch sensing to be acted upon. For example, head worn device 105 may be in a "locked" or "dormant" facial sensing state before the user's facial interaction is interpreted as an input. For example, when head worn device 105 is in a locked state, the user may be able to scratch his face without causing an input. Alternatively, the facial sensing capabilities of head worn device 105 may always be in an "on" state.

Figure 4:
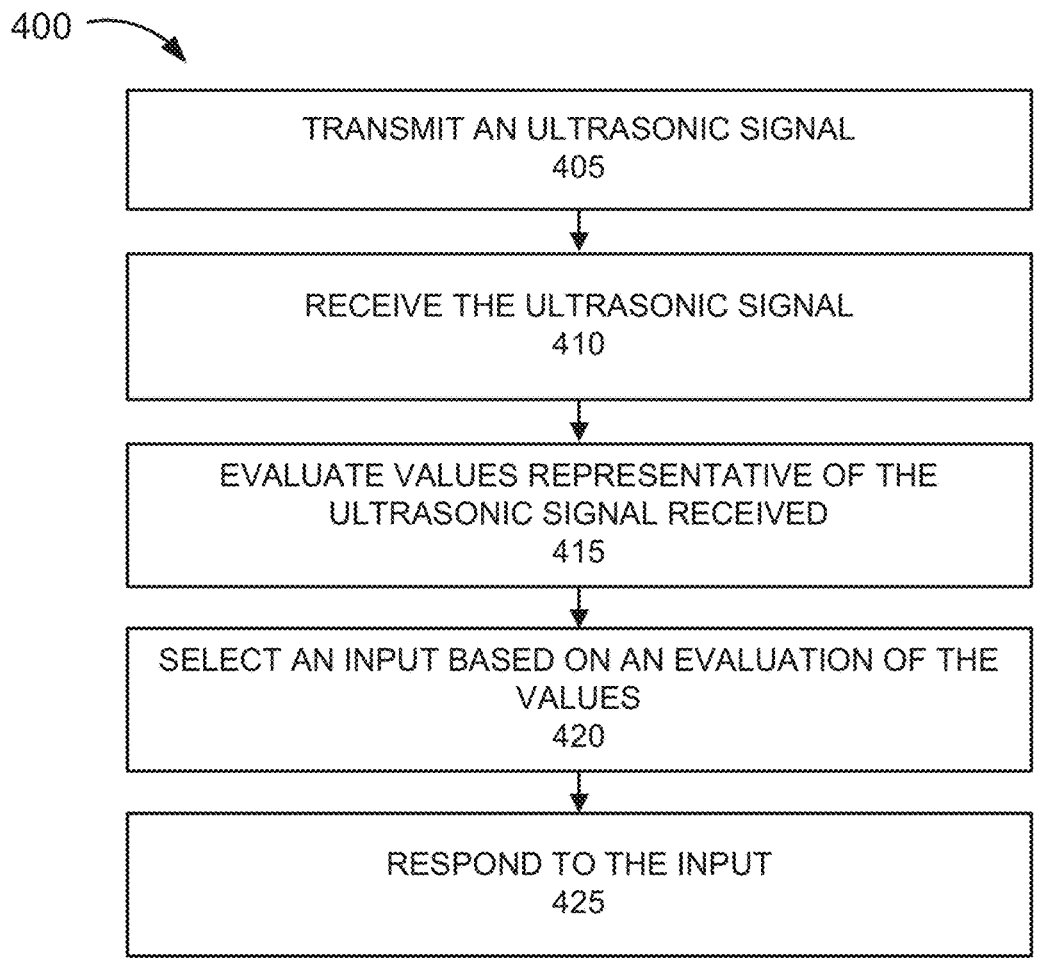
FIG. 4 is a flow diagram illustrating an exemplary process to provide an ultrasound-based facial and modal touch sensing service.

FIG. 4 is a flow diagram illustrating an exemplary process 400 to provide ultrasound-based, facial and modal touch sensing. A step or an act described in process 400 may be performed by one or multiple components of head worn device 105. For example, processor 205 may execute software 215 to perform the step described. According to process 400, assume that head worn device 105 has been trained and able to select an input based on receiving ultrasound events.

Referring to FIG. 4, in block 405, an ultrasonic signal is transmitted. For example, ultrasonic transmitter 235 transmits an ultrasonic signal. The ultrasonic signal propagates along one or multiple portions of a user's face. Assume that the user performs some action on a portion of the user's face via which the ultrasonic signal propagates.

In block 410, the ultrasonic signal is received. For example, ultrasonic receiver 240 of head worn device 105 receives the ultrasonic signal. Ultrasonic receiver 240 passes values representative of the received ultrasonic signal to input interpreter 245.

In block 415, the ultrasonic signal is evaluated. For example, input interpreter 245 evaluates the values to select a particular input. For example, input interpreter 245 uses database 260 to compare ultrasonic signal characteristics associated with the ultrasonic signal with the data stored in database 260. As previously described, database 260 includes data indicating a particular mode. The particular mode may be based on facial expression and/or muscle state (e.g., relaxed, contracted, a degree of contraction, or a transition from one state to another) of the user when the user performed the action.

In block 420, an input is selected based on an evaluation of the values. For example, input interpreter 245 uses the ultrasonic signal characteristic(s) to select the appropriate input. For example, input interpreter 245 uses database 260 to select the input mapped to the values stored in database 260 that matched or best matched the values associated with the received ultrasonic signal.

In block 425, the head worn device responds to the input. For example, head worn device 105 executes processes associated with the input.

Although FIG. 4 illustrates an exemplary process 400 to provide ultrasound-based, facial and modal touch sensing, process 400 may include additional operations, fewer operations, and/or different operations than those illustrated in FIG. 4, and as described.

The foregoing description of embodiments provides illustration, but is not intended to be exhaustive or to limit the embodiments to the precise form disclosed. Accordingly, modifications to the embodiments described herein may be possible. For example, head worn device 105 may include a gyroscope. The gyroscope may provide orientation data. In this way, in addition to multiple modes, orientation may add another dimension to the available inputs. For example, head worn device 105 may detect that the user's head is oriented to the left or the right. Based on these differences, different types of inputs may be mapped.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks has been described with regard to the process illustrated in FIG. 4, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software, firmware, and/or hardware. For example, a process or a function may be implemented as "logic" or as a "component." This logic or this component may include hardware (e.g., processor 205, a dedicated processor (not illustrated), etc.) or a combination of hardware and software (e.g., software 215). The embodiments have been described without reference to the specific software code since software can be designed to implement the embodiments based on the description herein and the accompanying drawings.

Additionally, embodiments described herein may be implemented as a non-transitory storage medium that stores data and/or information, such as instructions, program code, data structures, program modules, an application, etc. For example, a non-transitory storage medium includes one or more of the storage mediums described in relation to memory/storage 210.

The terms "comprise," "comprises" or "comprising," as well as synonyms thereof (e.g., include, etc.), when used in the specification is meant to specify the presence of stated features, integers, steps, or components but does not preclude the presence or addition of one or more other features, integers, steps, components, or groups thereof. In other words, these terms are to be interpreted as inclusion without limitation.

In the preceding specification, various embodiments have been described with reference to the accompanying drawings. However, various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, or instruction described in the present application should be construed as critical or essential to the embodiments described herein unless explicitly described as such.

What is claimed is:

1. A method comprising:
   transmitting, by a device that is worn by a user, an ultrasonic signal, wherein the ultrasonic signal propagates through the tissue of the user's body;
   receiving, by the device, the ultrasonic signal that propagated through the tissue of the user's body;
   analyzing, by the device, at least one characteristic of the received ultrasonic signal to determine a value of the at least one characteristic,
      wherein the at least one characteristic includes at least one of a frequency, an amplitude, a phase, or a propagation speed,
      wherein the value of the at least one characteristic is a result of a combination of an on-body touch in an area in which the ultrasonic signal has propagated and a first contraction state of a muscle of the user through which the ultrasonic signal has propagated, and
      wherein the combination of the on-body touch and the first contraction state of the muscle result in a distinguishable value of the at least one analyzed characteristic as compared to the value of the analyzed characteristic that results from a combination of the on-body touch and a second contraction state of the muscle; and
   selecting, by the device, an input based on the value of the at least one analyzed characteristic.

2. The method of claim 1, further comprising:
   performing, by the device, an action specified by the input.

3. The method of claim 1, further comprising:
   generating an ultrasonic signal profile based on the value of the at least one analyzed characteristic;
   storing a database that maps predefined signal profiles to respective data that indicates inputs; and
   comparing the generated ultrasonic signal profile to the predefined signal profiles stored in the database to determine a predefined signal profile that is most similar to the generated ultrasonic signal profile; and
   wherein the selecting comprises selecting the input that is mapped to the predefined signal profile that is determined to be most similar to the generated ultrasonic signal profile.

4. The method of claim 1, wherein the input is one of an input that can be made by at least one of a mouse, a keyboard, or a touch display.

5. The method of claim 1, wherein the input is application-specific.

6. The method of claim 1, wherein the on-body touch is a tap or a sliding gesture.

7. A device comprising:
   an ultrasound transducer, wherein the ultrasound transducer transmits an ultrasonic signal, wherein the ultrasonic signal propagates through the tissue of a body of a user wearing the device, and wherein the ultrasound transducer receives the ultrasonic signal that propagated through the tissue of the user's body;
   a memory, wherein the memory stores software; and
   a processor, wherein the processor executes the software to:
      analyze at least one characteristic of the received ultrasonic signal to determine a value of the at least one characteristic,
         wherein the at least one characteristic includes at least one of a frequency, an amplitude, or a propagation speed,
         wherein the value of the at least one characteristic is a result of a combination of an on-body touch in an area in which the ultrasonic signal has propagated and a contraction state of a muscle of the user through which the ultrasonic signal has propagated, and
         wherein the combination of the on-body touch and the first contraction state of the muscle result in a distinguishable value of the at least one analyzed characteristic as compared to the value of the analyzed characteristic that results from a combination of the on-body touch and a second contraction state of the muscle; and
      select an input based on the value of the at least one analyzed characteristic.

8. The device of claim 7, further comprising:
   a communication interface, wherein the processor further executes the software to:
   transmit, via the communication interface, the selected input to another device.

9. The device of claim 7, wherein the processor further executes the software to:
   generate an ultrasonic signal profile based on the at least one determined characteristic;
   store a database that maps predefined signal profiles to respective data that indicates inputs; and
   compare the generated ultrasonic signal profile to the predefined signal profiles stored in the database to determine a predefined signal profile that is most similar to the generated ultrasonic signal profile; and
   wherein, when selecting, the processor further executes the software to select the input based on the comparison.

10. The device of claim 7, wherein the input is one of an input that can be made by at least one of a mouse, a keyboard, or a touch display.

11. A non-transitory storage medium that stores instructions executable by a processor of a computational device, which when executed, cause the computational device to:
   transmit, by an ultrasound transducer, an ultrasonic signal, wherein the ultrasonic signal propagates through the tissue of the body of a user;
   receive, by the ultrasound transducer, the ultrasonic signal that propagated through the tissue of the body of the user;
   analyze at least one characteristic of the ultrasonic signal to determine a value of the at least one characteristic, wherein the at least one characteristic includes at least one of a frequency, an amplitude, or a propagation speed, wherein the value of the at least one determined characteristic is a result of a combination of an on-body touch in an area in which the ultrasonic signal has propagated and a contraction state of a muscle of the user through which the ultrasonic signal has propagated, wherein the combination of the on-body touch and the first contraction state of the muscle result in a distinguishable value of the at least one analyzed characteristic as compared to the value of the analyzed characteristic that results from a combination of the on-body touch and a second contraction state of the muscle; and select an input based on the value of the at least one analyzed characteristic; and perform an action specified by the input.

12. The non-transitory storage medium of claim 11, wherein the instructions comprise instructions to:

generate an ultrasonic signal profile based on the value of the at least one analyzed characteristic;

store a database that maps predefined signal profiles to respective data that indicates inputs; and compare the generated ultrasonic signal profile to the predefined signal profiles stored in the database to determine a predefined signal profile that is most similar to the generated ultrasonic signal profile; and wherein the selecting comprises selecting the input that is mapped to the predefined signal profile that is determined to be most similar to the generated ultrasonic signal profile.

13. The method of claim 1, wherein the tissue of the user's body consists of the tissue of the user's face, and wherein the on-body touch consists of an on-face touch.

14. The device of claim 7, wherein the tissue of the body of the user consists of the tissue of the face of the user, and wherein the on-body touch consists of an on-face touch.

15. The device of claim 7, wherein the on-body touch and the first contraction state of the muscle result in a distinguishable value of the at least one analyzed characteristic as compared to a second on-body touch different from the on-body touch and a second contraction state of the muscle.

16. The method of claim 1, wherein the on-body touch and the first contraction state of the muscle result in a distinguishable value of the at least one analyzed characteristic as compared to a second on-body touch different than the on-body touch and a second contraction state of the muscle.

* * * * *